No. 766,846. PATENTED AUG. 9, 1904.
D. T. SHARPLES.
TEAT CUP FOR MILKING APPARATUS.
APPLICATION FILED JULY 1, 1902.
NO MODEL.
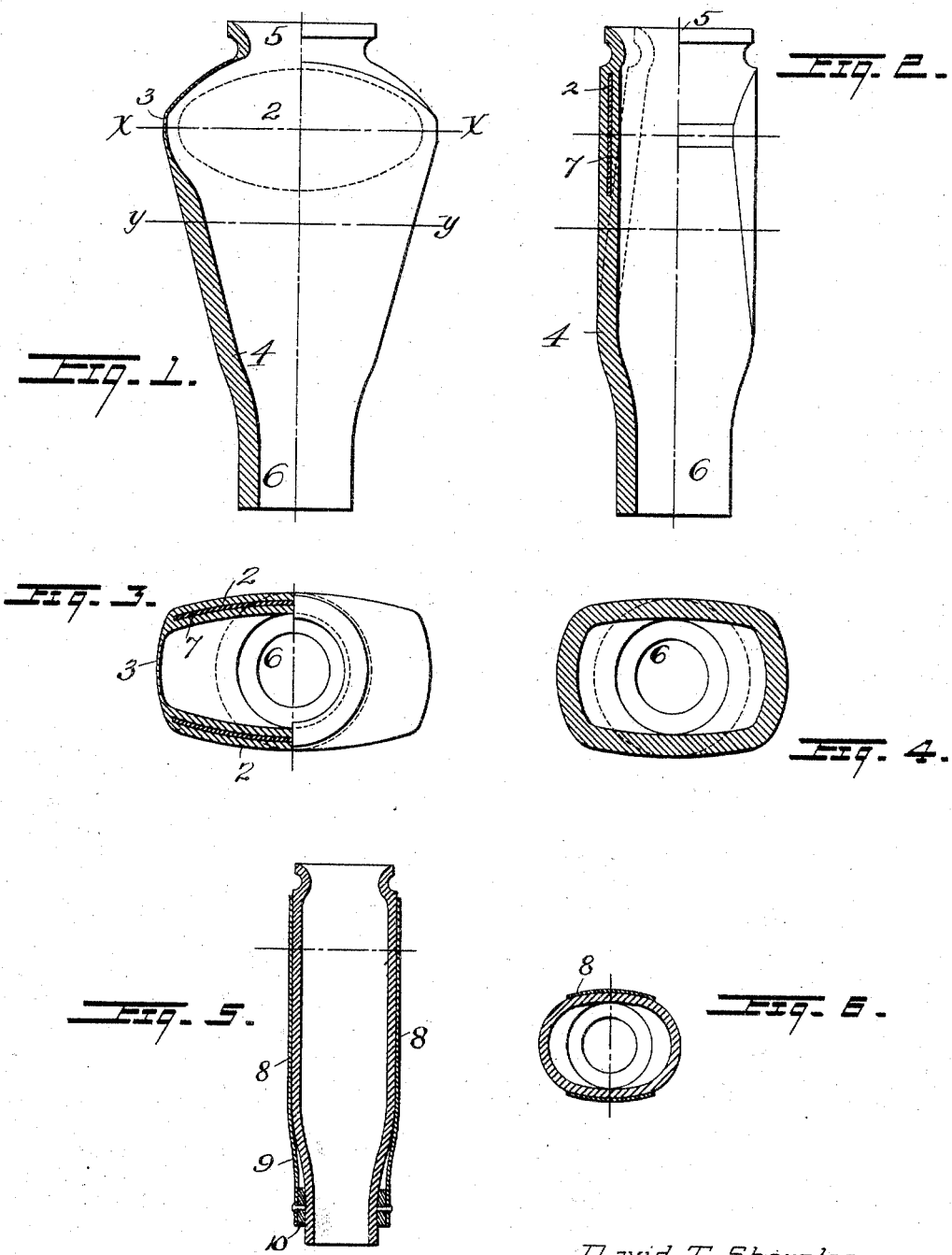
Witnesses
Caleb J. Biebel
D. M. Stewart
David T. Sharples
Inventor
By
Attorney No. 766,846.                                                         Patented August 9, 1904.

UNITED STATES PATENT OFFICE.

DAVID TOWNSEND SHARPLES, OF WESTCHESTER, PENNSYLVANIA.

TEAT-CUP FOR MILKING APPARATUS.

SPECIFICATION forming part of Letters Patent No. 766,846, dated August 9, 1904.

Application filed July 1, 1902. Serial No. 113,906. (No model.)

*To all whom it may concern:*

Be it known that I, DAVID TOWNSEND SHARPLES, a citizen of the United States, residing in Westchester, county of Chester, State of Pennsylvania, have invented a certain new and useful Improvement in Teat-Cups for Milking Apparatus, of which the following is a specification.

My invention relates to milking apparatus, and particularly to the teat-cups which are commonly employed in connection therewith.

The main object of my invention is to provide for utilizing to the best advantage a collapsing pressure exerted upon the exterior surface of the cup; and to this end my invention consists in so constructing the walls of the cup as to concentrate the collapsing pressure exerted upon a considerable surface thereof on that portion of the cup which will most effectively manipulate the teat.

The novel features of the invention are fully described in connection with the accompanying drawings and are specifically pointed out in the claims.

Figure 1 is an elevation (one-half in vertical section) of a form of teat-cup embodying my invention. Fig. 2 is a similar elevation and half-section taken at right angles to Fig. 1. Figs. 3 and 4 are cross-sectional views taken on the lines *x x* and *y y*, respectively, of Figs. 1 and 2. Figs. 5 and 6 show a modified construction.

In manipulating the teat by means of a collapsible teat-cup the action should be, as in hand-milking, to first compress the upper or base portion of the teat, so as to either partially or wholly cut off communication with the udder and thereafter to compress the body of the teat to expel the milk. In order to produce this effect by means of an external pressure acting upon the whole surface of the cup, as in pneumatic milking apparatus, I provide for concentrating the collapsing effect of this external pressure on the cup, so as to localize it, preferably at the mouth end of the cup, which engages the base of the teat, and thereafter extend it to the adjacent portion thereof, and in order to secure a sufficient collapsing effect with a moderate pressure I also provide for an increased effective pressure-surface by means by which such moderate pressure is concentrated, so as to operate the teats as effectively as a much higher pressure ordinarily would. To secure these results, I preferably form the walls of the cup, as shown in the drawings, with opposite stiff portions 2 2, extending lengthwise of the cup, and with connecting wall portions 3 3 of reduced rigidity toward the mouth end of the cup, but serving as a rigid connection of the lower ends of these stiffened wall portions, as at 4, so that these portions will have a fixed spread below, while their upper ends will have a pivotal or hinge-like closing-together movement due to the pressure upon their whole extent of surface. Thus it will be seen that the pressure upon a considerable surface is concentrated at a desired point, which is the essential feature of my invention, and that this feature not only enables the pressure to be utilized at a desired point, but also permits the use of a low working pressure.

In order to provide sufficient pressure-surface to secure satisfactory results with a reduced working pressure, the area of the stiffened wall portions 2 2 is shown increased by widening the cup, preferably adjacent to the mouth, as shown, thus providing for securing ample pressure upon the base of the teat with very moderate operating pressure; but the form of the cup is immaterial, so long as there is sufficient effective area of the stiffened wall portions to cause them to properly close together, as described, upon the inclosed teat under the working pressure provided. The mouth 5 and the connecting end 6 may be formed as desired.

The wall portions 2 2 may be properly stiffened in any desired manner. In Figs. 1 to 4 a rigid plate 7 is shown inserted in the rubber, of which the cup is formed, in process of manufacture. In the modified construction indicated in Figs. 5 and 6 side plates 8 are shown on the exterior of the body of the cup, with their lower ends 9 secured to a rigid cup-band 10, whereby they are fixedly spread below, while their upper portions are readily sprung together by the concentrated pressure operating upon the whole stiffened portion of the cup. The construction may obviously be otherwise modified without departing from the spirit of my invention.

What I claim is—

1. An integrally-formed teat-cup having a body of oblong cross-section with opposite flattened wall portions of stiff construction, and flexible portions connecting the edges of said stiff portions.

2. An integrally-formed teat-cup having a body of oblong cross-section with opposite flattened wall portions of stiff construction, flexible portions connecting the edges of said stiffened portions, and a reduced flexible mouth portion.

3. A teat-cup having a body of oblong cross-section with flattened opposite wall portions of a stiff structure flexibly connected at their edges and of fixed spread at one end and variable spread toward the other and an integrally-formed yielding mouth portion.

4. A teat-cup formed with a yielding mouth portion, and stiffened oppositely-arranged wall portions below said mouth having yieldingly-connected edges, said stiffened wall portions being of increased area adjacent to the mouth portion and having a fixed spread at one end and a pivotal closing-together movement under uniform external pressure.

In testimony whereof I affix my signature in the presence of two witnesses.

DAVID TOWNSEND SHARPLES.

Witnesses:
P. M. SHARPLES,
I. ROBERTS COMFORT.